US008550163B2

(12) United States Patent
Al-Yousif et al.

(10) Patent No.: US 8,550,163 B2
(45) Date of Patent: *Oct. 8, 2013

(54) OIL RECOVERY PROCESS FOR CARBONATE RESERVOIRS

(75) Inventors: Ali Abdullah Al-Yousif, Dhahran (SA); Abdulaziz Obaid Al-Kaabi, Dhahran (SA); Salah Hamad Al-Saleh, Dhahran (SA)

(73) Assignee: Saudi Arabian Oil Company, Saudi Arabia (SA)

( * ) Notice: Subject to any disclaimer, the term of this patent is extended or adjusted under 35 U.S.C. 154(b) by 363 days.

This patent is subject to a terminal disclaimer.

(21) Appl. No.: 12/842,558

(22) Filed: Jul. 23, 2010

(65) Prior Publication Data

US 2012/0018160 A1    Jan. 26, 2012

(51) Int. Cl.
*E21B 43/26* (2006.01)
*E21B 43/00* (2006.01)

(52) U.S. Cl.
USPC ........................................ 166/305.1; 166/369

(58) Field of Classification Search
None
See application file for complete search history.

(56) References Cited

U.S. PATENT DOCUMENTS

| | | | |
|---|---|---|---|
| 1,651,311 A | 11/1927 | Atkinson | |
| 3,474,864 A | 10/1969 | Hurd | |
| 3,477,508 A | 11/1969 | Hurd | |
| 3,827,499 A * | 8/1974 | Norton et al. | 166/305.1 |
| 3,915,230 A | 10/1975 | Flournoy et al. | |
| 4,008,768 A * | 2/1977 | Birk | 166/270.1 |
| 4,036,300 A | 7/1977 | Holm et al. | |
| 4,166,038 A | 8/1979 | Stournas | |
| 4,191,253 A | 3/1980 | Kalfoglou | |
| 4,216,097 A | 8/1980 | Stournas | |
| 4,230,182 A | 10/1980 | Bousaid | |
| 4,232,737 A | 11/1980 | Tyler et al. | |
| 4,266,611 A | 5/1981 | Bousaid et al. | |
| 4,271,906 A | 6/1981 | Bousaid et al. | |
| 4,307,782 A | 12/1981 | Schievelbein | |
| 4,343,711 A | 8/1982 | Kalfoglou | |
| 4,364,431 A | 12/1982 | Saidi et al. | |
| 4,421,168 A * | 12/1983 | Hurd | 166/270.1 |
| 4,438,814 A | 3/1984 | Bousaid | |
| 4,448,698 A | 5/1984 | Trushenski | |
| 4,458,760 A | 7/1984 | Hurd | |
| 5,014,783 A | 5/1991 | McClure | |
| 2009/0194276 A1 | 8/2009 | Sheng | |
| 2009/0194281 A1 | 8/2009 | Sheng | |

FOREIGN PATENT DOCUMENTS

| | | |
|---|---|---|
| CN | 1148660 A | 4/1997 |
| GB | 2455016 A | 6/2009 |
| WO | WO 2006/134367 A1 | 12/2006 |
| WO | WO 2009/047480 A1 | 4/2009 |

OTHER PUBLICATIONS

Alagic et al., "Combined Low Salinity Brine Injection and Surfactant Flooding in Mixed-Wet Sandstone Cores," Published May 21, 2010, Energy Fuels 2010, 24, 3551-3559.*

(Continued)

*Primary Examiner* — Angela M DiTrani
(74) *Attorney, Agent, or Firm* — Bracewell & Giuliani LLP

(57) ABSTRACT

A method for increasing oil production in a carbonate reservoir by conducting a step-wise reduction of salinity of the injected salt water that is injected into the carbonate reservoir. The method provides for increased oil production as compared to conventional waterflooding techniques.

24 Claims, 4 Drawing Sheets

(56) References Cited

OTHER PUBLICATIONS

PCT International Search Report; Dated Sep. 16, 2011; International Application No. PCT/US2011/043829; International Filing Date: July 13, 2011.

Buckley, J., "An Overview of Likely Mechanisms" Low Salinity Waterflooding, Jan. 15, 2009, http://eori.uwyo.edu.

Rezaeidoust, A., Puntervold, T., Strand, S. and Austad T., "Smart Water as Wettability Modifier in Carbonate and Sandstone: A Discussion of Similarities/Differences in the Chemical Mechanisms" Energy Fuels Article, Aug. 12, 2009, 4479-4485, 23, American Chemical Society.

Xie, S., Pu, H. and Morrow, N., "Aspects of Waterflooding" University of Wyoming, Jan. 13, 2010, Denver, CO.

Babadagli, et al. "A Laboratory Feasibility Study of Dilute Surfactant Injection for the Yibal Field, Oman" SPE 78352, Presented at the SPE 13th European Petroleum Conference, Aberdeen, Scotland, U.K., Oct. 29-31, 2002.

Michels, et al. "Enhanced Waterflooding Design With Dilute Surfactant Concentrations for North Sea Conditions" SPE Reservoir Engineering, Aug. 1996, 11(3):189-195.

Yousef, et al., "Laboratory investigation of Novel Oil Recovery Method for Carbonate Reservoirs", SPE 137634, Presented at the Canadian Unconventional Resources & International Petroleum Conference, Calgary, Canada, Oct. 19-21, 2010.

Austad, T., et al. "Seawater as IOR Fluid in Fractured Chalk," 2005 S{E International Symposium on Oilfield Chemistry, Houston, Texas, SPE 93000, Feb. 2-4, 2005, Society of Petroleum Engineers, Inc.

Austad, T., et al. "Seawater in Chalk: An EOR and Compaction Fluid, Reservoir Evaluation & Engineering," 2007 International Petroleum Technology Conference, Dubai, SPE 118431, Dec. 4-6, 2007, Society of Petroleum Engineers, Inc.

Doust, A.R., et al., "Smart Water as Wettability Modifier in Carbonate and Sandstone," 15th European Symposium on Improved Oil Recovery, Paris, France, Apr. 27-29, 2009.

Lager, A., et al., "Low Salinity Oil Recovery—An Experimental Investigation," International Symposium of the Society of Core Analysis, SCA2006-36, Trondheim, Norway, Sep. 12-16, 2006.

Lager, A., et al., "LoSal Enhanced Oil Recovery: Evidence of Enhanced Oil Recovery at the Reservoir Scale," Presented at the 2008 SPE/DOE Improved Oil Recovery Symposium, Tulsa, Oklahoma, SPE 113976, Apr. 19-23, 2008, Society of Petroleum Engineers, Inc.

Morrow, N.R., et al., "Prospects of Improved Oil Recovery Related to Wettability and Brine Composition," Journal of Petroleum Science and Engineering, Jan. 21, 1998, pp. 267-276, vol. 20, Elsevier Science B.V.

Robertson, E.P., et al., "Improved Waterflooding Through Injection-Brine Modification," U.S. Department of Energy Assistant Secretary for Office of Fossil Energy Under DOE Idaho Operations Office Contract DE-AC07-99ID13727, INEE/EXT-02-01591, Jan. 2003.

Strand, S., et al., "Wettability Alteration of Carbonates—Effects of Potential Determining Ions (CA 2+ and SO 4 2-) and Temperature," Colloids and Surfaces, Oct. 27, 2005, Elsevier B.V., Available online at www.sciencedirect.com.

Tang, G.Q., et al., "Salinity, Temperature, Oil Composition, and Oil Recovery by Waterflooding," Presented at the 1996 SPE Annual Technical Conference and Exhibition, Denver, Colorado, SPE 36680, Oct. 6-9, 2006, pp. 269-276, Society of Petroleum Engineers, Inc.

Tang, G.Q., et al., "Influence of Brine Composition and Fines Migration on Crude Oil/Brine/Rock Interactions and Oil Recovery," Journal of Petroleum Science and Engineering, 1999, pp. 99-111, vol. 24, Elsevier Science B.V.

Tweheyo, M.T., et al., "The Effects of Temperature and Potential Determining Ions Present in Seawater on Oil Recovery From Fractured Carbonates," Presented at the 2006 SPE/DOE Symposium on Improved oil Recovery, Tulsa, Oklahoma, SPE 99438, Apr. 22-26, 2006, Society of Petroleum Engineering, Inc.

Webb, K.J., et al., "Low Salinity Oil Recovery—Long-Inject-Long," Presented at the 2005 SPE/DOE Fourteenth Symposium on Improved Oil Recovery, Tulsa, Oklahoma, SPE 89379, Apr. 17-21, 2004, Society of Petroleum Engineers, Inc.

Zhang, P., et al., "Wettability Alteration and Improved Oil Recovery by Spontaneous Imbibition of Seawater Into Chalk: Impact of the Potential Determining Ions Ca 2+, Mg 2+, and SO 4 2-," Colloids and Surfaces, Dec. 15, 2006, Elsevier B.V., Available online at www.sciencedirect.com.

Zhang, Y., et al., "Comparison of Secondary and Tertiary Recovery With Change in Injection Brine Composition for Crude Oil/Sandstone Combinations," Presented at the 2006 SPE/DOE Symposium on Improved Oil Recovery, Tulsa, Oklahoma, SPE 99757, Apr. 22-26, 2006, Society of Petroleum Engineers, Inc.

\* cited by examiner

OIL RECOVERY PROCESS FOR CARBONATE RESERVOIRS

TECHNICAL FIELD OF THE INVENTION

The present invention relates to a process for improving oil recovery in carbonate reservoirs. More specifically, embodiments of the present invention utilize an initial waterflooding step having a first water solution with subsequent waterflooding steps employing water solutions having reduced saline concentrations as compared to the first water solution.

BACKGROUND OF THE INVENTION

Waterflooding is a method of secondary recovery in which water is injected into a reservoir formation to displace mobile oil within the reservoir formation. The water from injection wells physically sweeps the displaced oil to adjacent production wells, so that the oil can be collected from the production wells. Generally, the water used in a waterflooding process is taken from nearby water sources, which is usually either seawater or produced water.

It is known that a reduction in salinity values of the injected water can increase oil production for sandstone reservoirs. However, the low salinity floods have only been shown to work if the reservoir contains clays and with water having salinity values that are less than 5,000 ppm.

Carbonate reservoirs do not contain such clays. As such, the low salinity water flooding teachings known heretofore specifically teach away from the successful use of low salinity water for carbonate reservoirs. See A. Lager et al., "*Low Salinity Oil Recovery—An Experimental Investigation*," paper presented at the Society of Core Analysts, September 2006 ("Finally it explains why LoSal™ does not seem to work on carbonate reservoirs."). See also A. R. Doust et al., "*Smart Water as Wettability Modifier in Carbonate and Sandstone*," paper presented at 15$^{th}$ European Symposium on Improved Oil Recovery, April 2009 ("The wettability modification in carbonates can take place at high salinities, i.e. SW salinity. If SW is diluted by distilled water to a low saline fluid, ~2000 ppm, the oil recovery will decrease due to a decrease in the active ions.").

It would be desirable to have an improved process for waterflooding carbonate reservoirs that was simple and efficient. Preferably, it would be desirable to have a process that did not require the use of complicated chemicals or gases such as carbon dioxide, surfactants, polymers, or the like. Additionally, it would be beneficial if the process for an improved waterflooding could be implemented with existing infrastructure.

SUMMARY OF THE INVENTION

The present invention is directed to a process that satisfies at least one of these needs. In one embodiment, the process for improving tertiary hydrocarbon recovery in carbonate reservoirs includes the steps of introducing a first water solution into the carbonate reservoir, recovering an amount of hydrocarbon from the carbonate reservoir, introducing a second water solution into the carbonate reservoir, and recovering a second amount of hydrocarbon from the carbonate reservoir. The first water solution has a first salt concentration, and the second water solution has a second salt concentration that is lower than the first salt concentration. In one embodiment, the first water solution has an ion composition that includes at least two ions selected from the group consisting of sulfate, calcium, and magnesium. In another embodiment, the ion composition comprises three ions: sulfate, calcium, and magnesium.

In one embodiment, the ratio of the second salt concentration to the first salt concentration is in a range from about 0.1 to 0.9. In another embodiment, the ratio of the second salt concentration to the first salt concentration is in a range from about 0.5 to 0.75. In another embodiment, the ratio of the second salt concentration to the first salt concentration is about 0.5. In an embodiment, the first salt concentration is within a range of 35,000 to 70,000 ppm by weight. In another embodiment, the second salt concentration is within a range of 3,500 to 60,000 ppm by weight. In another embodiment, the second salt concentration is within a range of 17,500 to 52,500 ppm by weight. In another embodiment, the second salt concentration is within a range of 17,500 to 35,000 ppm by weight. In another embodiment, the process is conducted at a reservoir temperature of between 70° C. and 100° C.

In another embodiment of the invention, the process can further include introducing a third water solution into the carbonate reservoir, and recovering a third amount of hydrocarbon from the carbonate reservoir. The third water solution has a third salt concentration that is lower than the second salt concentration. In one embodiment, the ratio of the third salt concentration to the first salt concentration is in a range from about 0.05 to 0.1. In another embodiment, the third salt concentration is within a range of 1,750 to 7,000 ppm by weight. In another embodiment, the third salt concentration is within a range of 3,500 to 7,000 ppm by weight. In one embodiment, the third amount of hydrocarbon is recovered until there is at least a 9% improvement in incremental oil recovery as compared to the second amount of hydrocarbon recovered.

In one embodiment, the carbonate reservoir is substantially free of clay. In another embodiment, the carbonate reservoir has an absence of clay. In yet another embodiment, the carbonate reservoir has an absence of sandstone rock. In another embodiment, the temperature within the carbonate reservoir is above 70° C. In another embodiment, the temperature within the carbonate reservoir is about 100° C.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
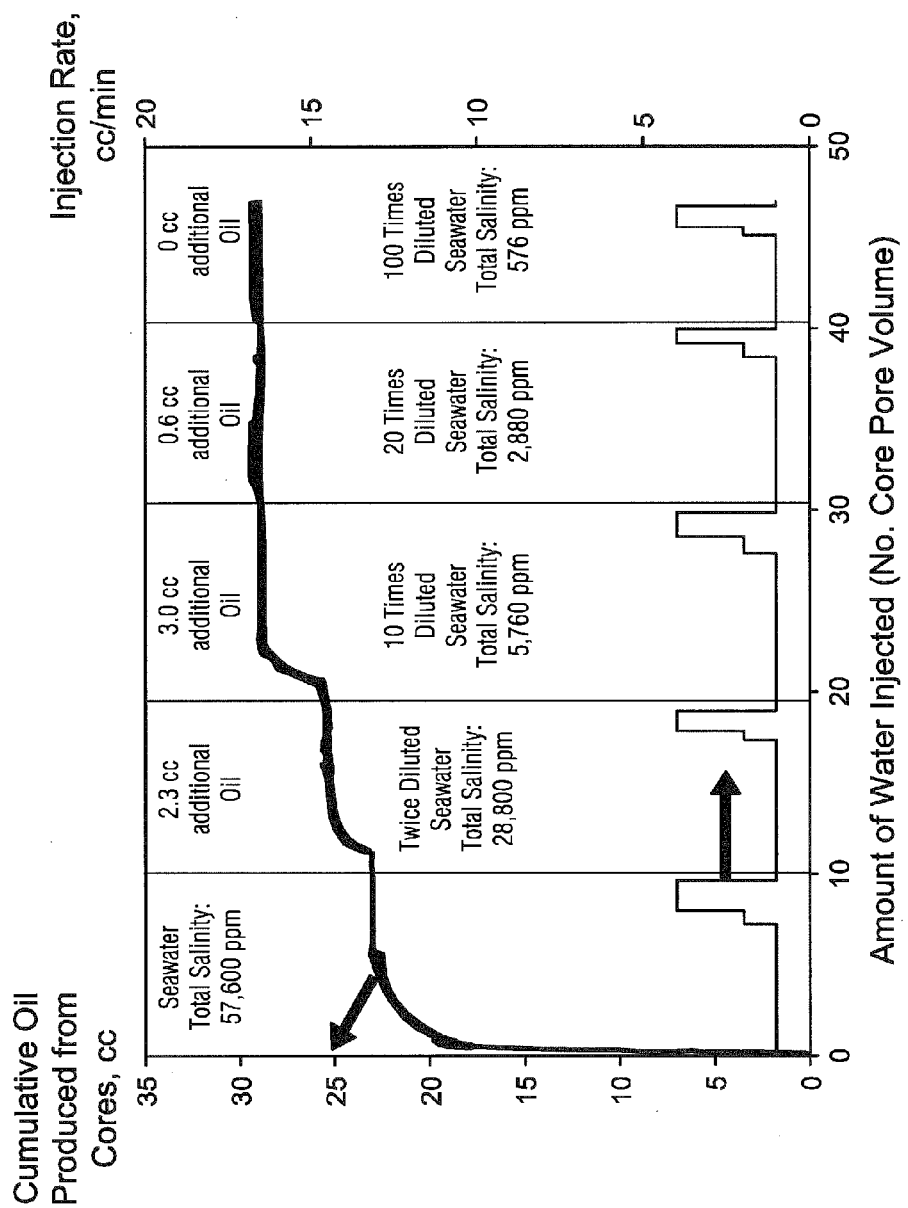
FIG. 1 shows data collected from an experiment in accordance with an embodiment of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, the process for improving tertiary hydrocarbon recovery in carbonate reservoirs includes the steps of introducing a first water solution into the carbonate reservoir, recovering an amount of hydrocarbon from the carbonate reservoir, introducing a second water solution into the carbonate reservoir, and recovering a second amount of hydrocarbon from the carbonate reservoir. The first water solution has a first salt concentration, and the second water solution has a second salt concentration that is lower than the first salt concentration. In one embodiment, the first water solution has an ion composition that includes at least two ions selected from the group consisting of sulfate, calcium, and magnesium.

The present invention is illustrated by the following examples, which are presented for illustrative purposes, only, and are not intended as limiting the scope of the invention which is defined by the appended claims.

Example 1

A coreflooding study was conducted to demonstrate an embodiment of the invention. The experimental parameters and procedures were well designed to reflect the initial conditions commonly found in carbonate reservoirs, as well as the current field injection practices.

The core material was selected from a carbonate reservoir in Saudi Arabia. Core plugs (1-inch in diameter, and 1.5-inch in length) were cut from whole cores. One composite core was selected for the coreflood experiments. Table I shows the petrophysical properties of the selected cores. The average porosity and liquid permeability are 25% and 41 milli-Darcy, respectively.

TABLE I

Basic Petrophysical Properties for Core Plugs

| Sample # | Length (cm) | Dia. (cm) | Air Permeability (mD) | Brine Permeability (mD) | Porosity (%) | Pore Volume by Routine Core analysis (cc) |
|---|---|---|---|---|---|---|
| 10 | 4.04 | 3.81 | 51.00 | 36.29 | 22.10 | 10.07 |
| 13 | 4.25 | 3.81 | 78.50 | 55.55 | 20.80 | 10.03 |
| 73 | 4.02 | 3.80 | 71.90 | 47.74 | 28.90 | 13.06 |
| 74 | 3.93 | 3.80 | 47.60 | 31.91 | 28.70 | 12.71 |
| Total | 20.66 | 3.80 | 63.6 | 40.8 | 25.26 | 45.87 |

The most predominant mineral in the selected carbonate cores is calcite (more than 90 wt %). Other minerals are dolomite (trace up to 9 wt %), and minor amount (<1 wt %) of quartz.

Two brines primarily were used in this study, including field connate water to establish initial or irreducible water saturation (Swi) for composite cores, and different salinity slugs of seawater as injected waters to displace oil out of cores. All brines were prepared from distilled water and reagent grade chemicals, based on geochemical analysis of field water samples. Table II depicts the geochemical analysis and the corresponding chemicals concentration for each type of brine. For the experiments described below, the seawater had a salinity of about 57,700 ppm by weight, and initial connate water is very saline with salinity of 214,000 ppm by weight.

TABLE II

Geochemical Analysis and Salt Concentrations for Major Sources of Water

| Ions | Field Connate Water | seawater |
|---|---|---|
| Sodium | 59,491 | 18,300 |
| Calcium | 19,040 | 650 |
| Magnesium | 2,439 | 2,110 |
| Sulfate | 350 | 4,290 |
| Chloride | 132,060 | 32,200 |
| Carbonate | 0 | 0 |
| Bicarbonate | 354 | 120 |
| TDS | 213,734 | 57,670 |

The salt recipes for major sources of water

| Salts | UTMN Connate Water | Qurayyah seawater |
|---|---|---|
| NaCl, g/L | 150.446 | 41.041 |
| $CaCl_2 \cdot 2H_2O$, g/L | 69.841 | 2.384 |
| $MgCl_2 \cdot 6H_2O$, g/L | 20.396 | 17.645 |
| $Na_2SO_4$, g/L | 0.518 | 6.343 |
| $NaHCO_3$, g/L | 0.487 | 0.165 |

Other dilute versions of seawater were also prepared by mixing with different volumes of deionized water. This includes:

Twice dilutes (50% salinity of seawater)

10 times dilutes (10% salinity of seawater)

20 times dilutes (5% salinity of seawater)

100 times dilutes (1% salinity of seawater)

The effect of salinity as well as ion composition on physical properties (density and viscosity) of prepared waters was studied. The density and viscosity properties were measured at reservoir temperature of 212° F. Table III shows the density and viscosity of different water types.

TABLE III

Density and viscosity of different water types

| Property | Field Connate Water | Seawater | Twice Diluted Seawater | 10 Times Diluted Seawater | 20 Times Diluted Seawater | 100 Times Diluted Seawater |
|---|---|---|---|---|---|---|
| Density (g/cc) | 1.1083 | 1.0152 | 0.9959 | 0.9812 | 0.9782 | 0.9779 |
| Viscosity (cp) | 0.476 | 0.272 | 0.242 | 0.232 | 0.212 | 0.193 |

Reservoir oil samples were collected from one carbonate reservoir. Crude oil filtration was conducted to remove solids and contaminants to reduce any experimental difficulties during coreflood experiments. In this coreflood experiment, live oil was used in which it was recombined from a separator of oil and gas such that the experimental conditions more closely resembled reservoir conditions in order to increase the accuracy of the experiment. As used herein, live oil is oil containing dissolved gas in solution that can be released from solution at surface conditions. Oil in reservoirs usually contains dissolved gas, and once it reaches the surface, gas tends to evolve out due to the lower pressures at the surface as compared to within the reservoir. As used herein, dead oil is oil at sufficiently low pressure that it contains no dissolved gas. Oil at the surface is typically considered dead oil. Total acid number, as well as other oil properties are listed in Table IV.

TABLE IV

Reservoir Oil Properties for Collected oil Samples

| Component | Amount |
|---|---|
| Saturates | 39.17% |
| Aromatics | 48.30% |
| Resins | 7.04% |
| Asphaltenes | 5.50% |
| Total Acid Number | 0.25 mg KOH/g oil |
| Saturation pressure, psia @ 212° F. | 1804 |
| Gas oil ratio, SCF/STB | 493 |
| Stock tank oil gravity °API @ 60° F. | 30.0 |
| Dead oil density at room temperature, lb/ft$^3$ | 54.50 |
| Dead oil viscosity at room temperature, cp | 14.59 |

Live Oil Viscosity @ 212° F.

| Pressure (psig) | viscosity (cp) |
|---|---|
| 4000 | 0.716 |
| 3000 | 0.691 |
| 14.7 | 2.03 |

Live Oil Density @ 212° F.

| Pressure | Density, lb/ft$^3$ |
|---|---|
| 3200 | 45.7 |
| 3000 | 45.5 |
| 2000 | 45.0 |
| 1766 | 44.9 |

The pore volume of cores, original oil in place, and connate water saturation of selected composite core plugs were determined using a centrifuge apparatus. The procedure for preparation of each core was as follows:

1. Measure dry weight of the core sample.
2. Saturate core plug under vacuum for 5-7 days with field connate water to achieve ionic equilibrium with the core samples.
3. Measure wet weight.
4. Determine pore volume by weight difference and the density of field connate water at room temperature.
5. Centrifuge each core plug at 5000 rpm for 12 hrs to drain the water in the pores and establish the initial water saturation.
6. Measure weight of centrifuged core sample.
7. Determine weight difference of the original oil in place (OOIP) and initial water saturation—prior and post centrifuge—and the density of field connate water.

Table V shows the pore volume calculation results using the centrifuge method with the initial water saturation for core plugs used in coreflood experiment. The total pore volume for the composite was 36.46 cc, and original oil in place (OOIP) was 32.79 cc. The average initial water saturation for the composite was 10.06%. The position of each core plug in the composite sample is ordered by a harmonic arrangement and the plugs are organized in the table as the first plug from the inlet to the last plug from outlet of the coreholder.

TABLE V

Pore Volume Determination for Core Samples

| Sample # | Dry Wt (g) | Wet Wt (g) | Liquid Wt (g) | Pore Volume (cc) |
|---|---|---|---|---|
| 13 | 101.53 | 110.76 | 9.23 | 8.04 |
| 74 | 81.22 | 92.48 | 11.26 | 9.81 |
| 73 | 81.95 | 93.93 | 11.98 | 10.44 |
| 10 | 92.88 | 102.26 | 9.38 | 8.17 |

TABLE VI

Water Saturation Results for Coreflooding Experiment

| Sample # | Wet Wt after 5000 RPM for 12 hrs (g) | Difference Wt (g) | Produced Fluid (cc) | Fluid Remaining in Rock (cc) | Swi (%) |
|---|---|---|---|---|---|
| 13 | 102.74 | 8.02 | 6.99 | 1.05 | 13.1% |
| 74 | 82.15 | 10.33 | 9.00 | 0.81 | 8.3% |
| 73 | 82.72 | 11.21 | 9.76 | 0.67 | 6.4% |
| 10 | 94.18 | 8.08 | 7.04 | 1.13 | 13.9% |

A coreflooding apparatus was then used to mimic reservoir conditions during a waterflood experiment. The experimental procedure followed is described below:

Fill all accumulators of the coreflooding apparatus with injected fluids including dead oil, live oil, and brines. Calibrate the three-phase separator to determine the oil production during waterflooding. Assemble and load the composite core plugs into a rubber sleeve and load into the core holder. Maintain a confining pressure of about 4500 psi on the composite core plugs by filling the core holder confining annulus. Set the back pressure regular at 200 psi. Flush dead oil through the composite core to displace gas and ensure complete fluid saturation. Maintain the dead oil flush until the pressure drop across the composite is stabilized. This can take as much as 1-2 weeks.

Set the reservoir temperature to approximately 212° F. and allow the composite to age at the reservoir temperature until the pressure drop across the composite is stabilized. This step can also take as long as 1-2 weeks. Set pore pressure for the composite to reservoir pressure (3000 psi for experiment). Inject live oil into the composite to displace the dead oil, and allow the composite plugs to age for 1-2 weeks until the pressure drop is stabilized. The composite plug now replicates the reservoir in terms of fluid saturations, temperature, pressure, and wettability status.

Conduct seawater flooding while monitoring: the amount of oil produced, the pressure drop across the composite, and the injection rate of the seawater as a function of time. Water was injected at a constant rate of approximately 1 cc/min until no more oil was produced. The injection rate was increased to 2 cc/min, and then to 4 cc/min to ensure all mobile oil was produced. The original seawater was then diluted with distilled water to make the salinity value 50% of the original. The 50% diluted seawater was then injected into the core sample following the same injection procedure as described above. The injection procedure was then repeated with diluted seawater having dilution ratios of 10:1, 20:1, and 100:1. The results from this experiment are shown in FIGS. 1-2.

FIG. 1 displays an incremental oil production curve. The oil production by seawater flooding is about 23 cc. The additional oil production by twice diluted seawater is about 2.3 cc; the additional oil production by 10 times diluted seawater is 3.0 cc; additional oil production by 20 times diluted seawater is about 0.6 cc; and no production observed by 100 times diluted seawater. Therefore, the incremental oil production by stepwise salinity reduction of seawater is 5.9 cc.

Figure 2:
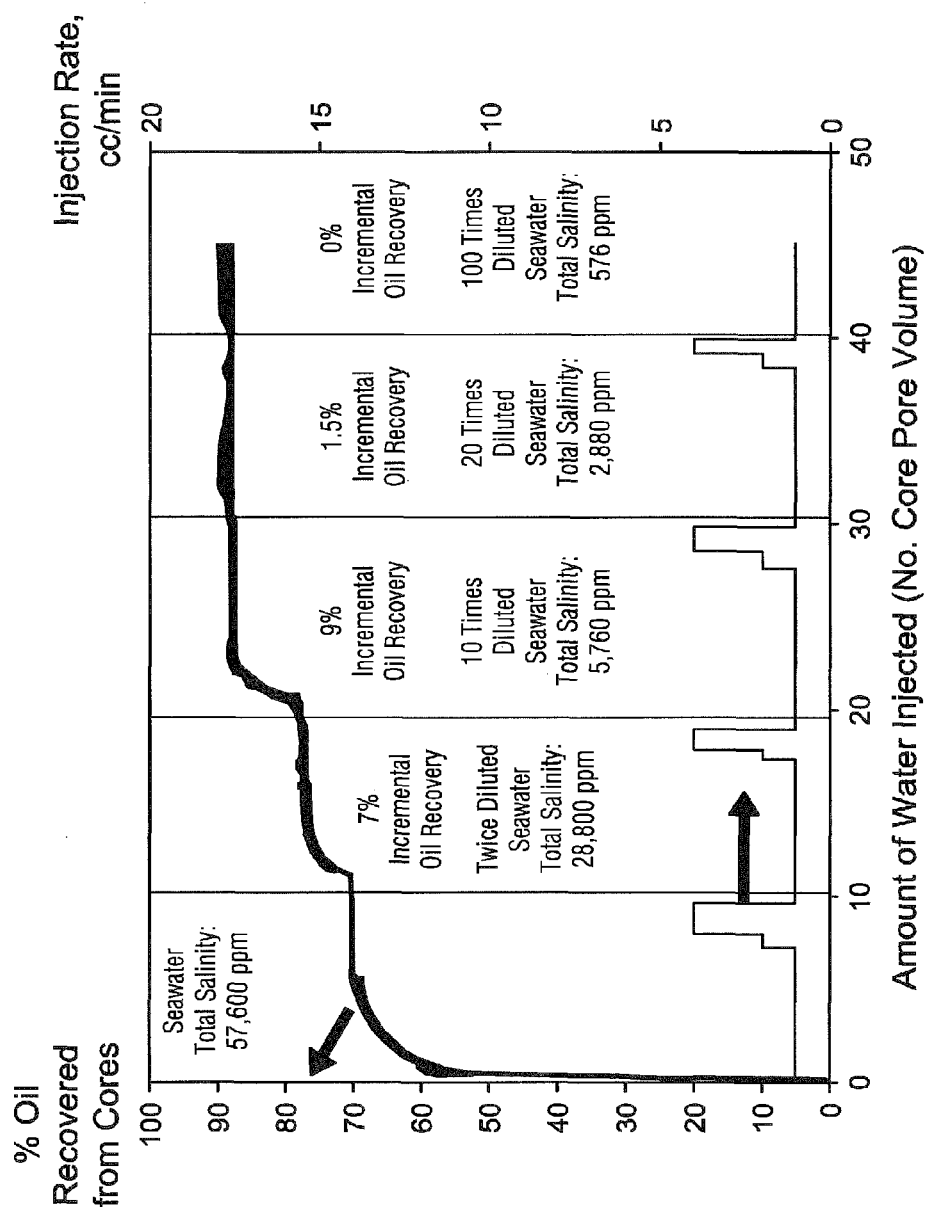
FIG. 2 shows data collected from an experiment in accordance with an embodiment of the present invention.

FIG. 2 displays an oil recovery curve expressed in percentage of oil recovered. The oil recovery by seawater flooding is about 67% in terms of original oil in place (OOIP); this targets mobile oil in the cores, and represents the secondary oil recovery. The additional oil recovery, over secondary recovery, was ~7% of OOIP with twice diluted seawater, ~9% with 10 times diluted seawater, ~1.5% with 20 times diluted seawater, and no significant oil recovery by 100 times diluted seawater. Therefore, the total incremental oil recovery, beyond conventional waterflooding, was approximately 17.5% by stepwise salinity and ion content reduction of injected water. This incremental oil recovery represents tertiary oil recovery.

Example 2

New composite cores (6 core plugs) were selected from the same carbonate reservoir to confirm and validate the results reported in Example 1. The types and properties of used fluids are the same as in Table III and Table IV from Example 1. The experimental procedure and parameters are also the same as indicated in Example 1.

Table VII lists the petrophysical properties of the selected cores. The average porosity and liquid permeability are 24.65% and 68 milli-Darcy, respectively.

TABLE VII

Basic Properties for Core Plugs

| Sample # | Length (cm) | Dia. (cm) | Air Permeability (mD) | Brine Permeability (mD) | Porosity (%) | Pore Volume by Routine Core analysis (cc) |
|---|---|---|---|---|---|---|
| 159 | 3.94 | 3.81 | 110.96 | 74.34 | 22.57 | 10.14 |
| 55 | 4.16 | 3.81 | 88.72 | 59.44 | 27.73 | 13.15 |
| 91 | 3.83 | 3.81 | 109.35 | 73.26 | 24.97 | 10.91 |
| 66 | 3.77 | 3.81 | 96.28 | 64.51 | 25.65 | 11.02 |
| 61 | 4.02 | 3.81 | 109.33 | 73.25 | 26.60 | 12.19 |
| 128 | 3.93 | 3.81 | 97.40 | 65.26 | 20.36 | 9.12 |
| Total/Avg | 23.65 | 3.81 | 102.0 | 68.3 | 24.65 | 66.53 |

Table VIII and Table IX show the pore volume calculation results using centrifuge method with the initial water saturation for core plugs used in coreflood experiment. The total pore volume for the composite was 63.23 cc, and original oil in place (OOIP) was 54.12 cc. The average initial water saturation for the composite was 14.4%. The position of each core plug in the composite sample is ordered by a harmonic arrangement and the plugs are organized in the tables as the first plug from the inlet to the last plug from outlet of the coreholder.

TABLE VIII

Pore Volume Determination for Core Samples

| Sample # | Dry Wt (g) | Wet Wt (g) | Liquid Wt (g) | Pore Volume (cc) |
|---|---|---|---|---|
| 159 | 91.2 | 102.72 | 11.52 | 10.03 |
| 55 | 89.39 | 103.45 | 14.06 | 12.25 |
| 91 | 83.21 | 95.19 | 11.98 | 10.44 |
| 66 | 82.75 | 94.85 | 12.1 | 10.54 |
| 61 | 87.6 | 100.69 | 13.09 | 11.40 |
| 128 | 94.25 | 104.07 | 9.82 | 8.55 |

TABLE IX

Water Saturation Results for Coreflooding Experiment

| Sample # | Wet Wt after 5000 RPM for 12 hrs (g) | Difference Wt (g) | Produced Fluid (cc) | Fluid Remaining in Rock (cc) | Swi (%) |
|---|---|---|---|---|---|
| 159 | 92.65 | 10.07 | 8.77 | 1.26 | 12.6% |
| 55 | 91.45 | 12.00 | 10.45 | 1.79 | 14.7% |
| 91 | 84 | 11.19 | 9.75 | 0.69 | 6.6% |
| 66 | 85.05 | 9.80 | 8.54 | 2.00 | 19.0% |
| 61 | 89.91 | 10.78 | 9.39 | 2.01 | 17.6% |
| 128 | 95.79 | 8.28 | 7.21 | 1.34 | 15.7% |

Figure 3:
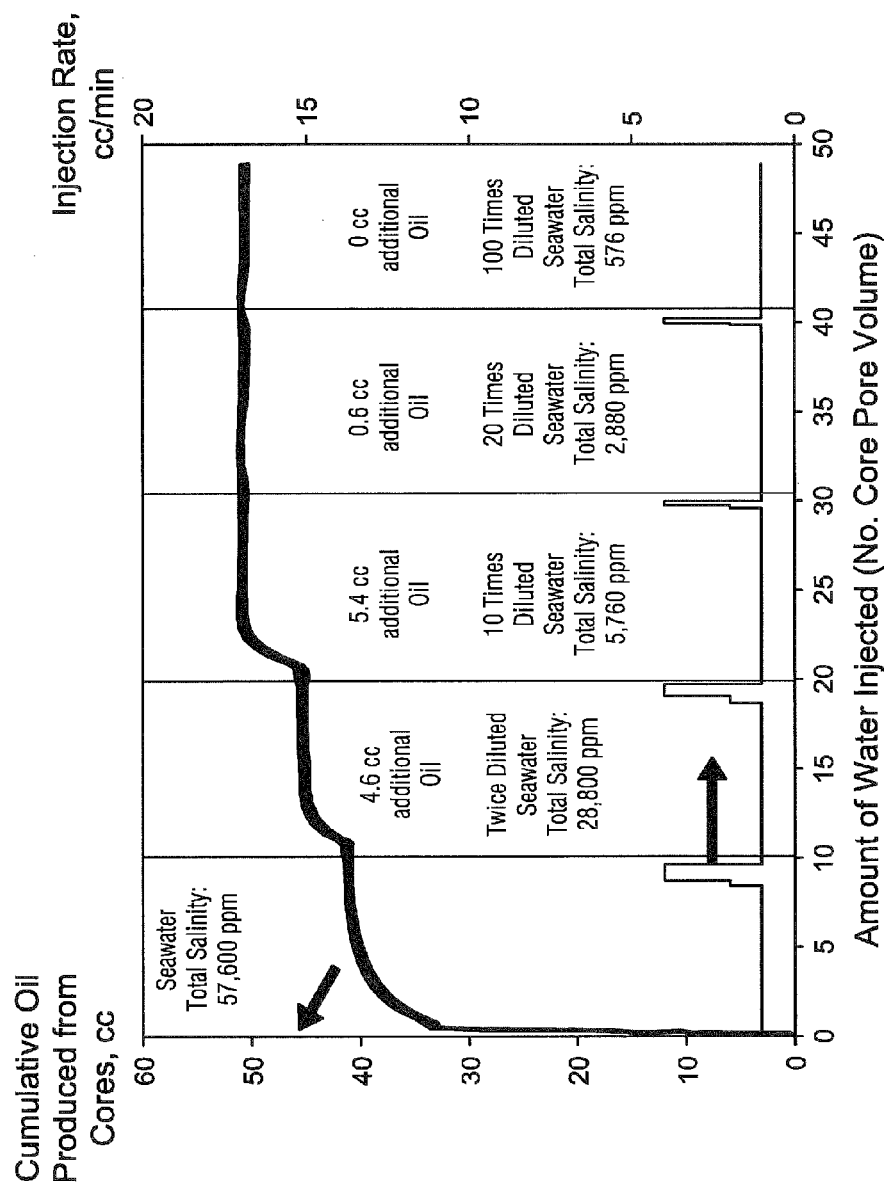
FIG. 3 shows data collected from an experiment in accordance with an embodiment of the present invention.

FIG. 3 displays the incremental oil production curve for Example 2. The oil production by seawater flooding is about 41 cc. The additional oil production is 4.6 cc with twice diluted seawater, 5.4 cc with 10 times diluted seawater, 0.6 cc with 20 times diluted seawater, no production with 100 times diluted seawater. Therefore, the total oil production beyond conventional waterflooding is about 10.6 cc by stepwise salinity and ionic content reduction of injected water.

Figure 4:
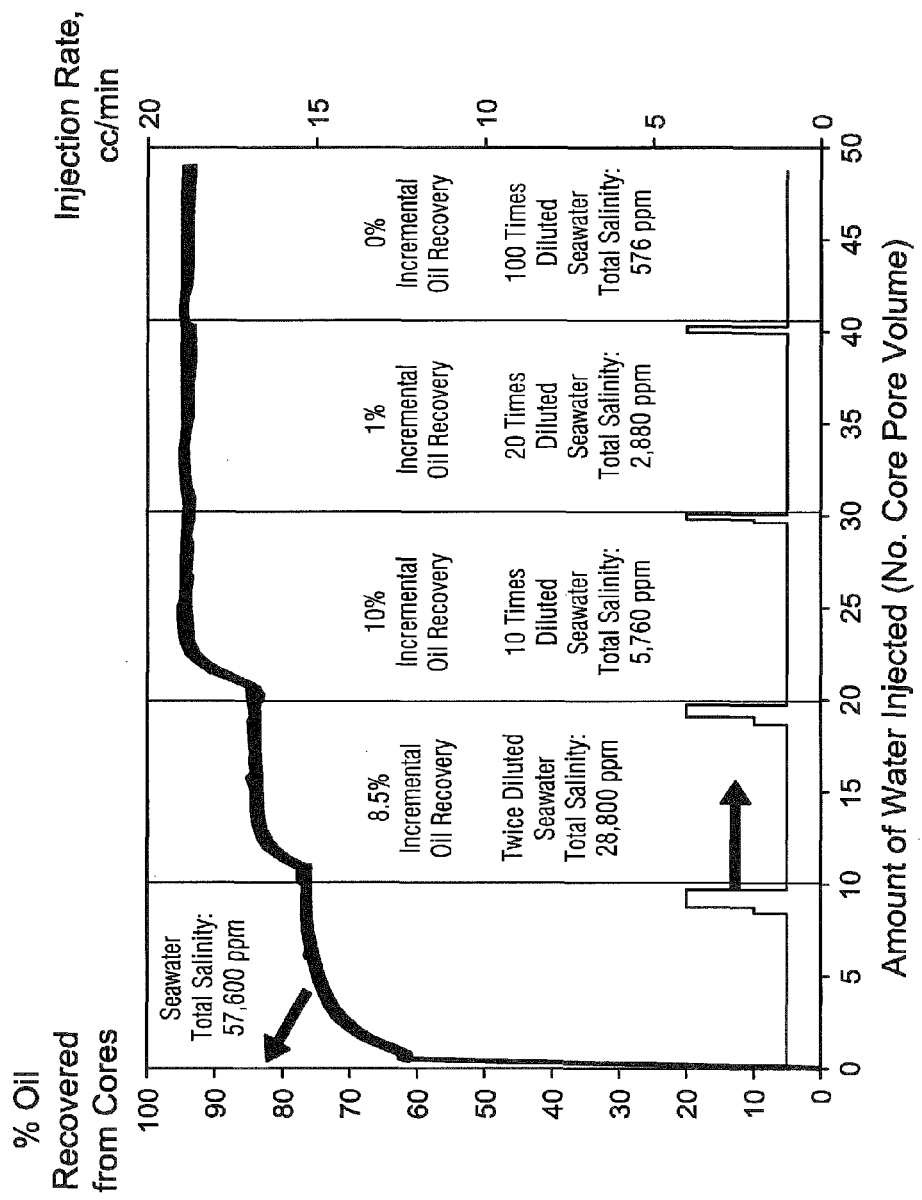
FIG. 4 shows data collected from an experiment in accordance with an embodiment of the present invention.

FIG. 4 displays an oil recovery curve expressed in percentage of oil recovered for Example 2. The oil recovery by seawater flooding is about 74% in terms of original oil in place (OOIP); this targets mobile oil in the cores, and represents the secondary oil recovery. The additional oil recovery, over secondary recovery, was ~8.5% of OOIP with twice diluted seawater, ~10% with 10 times diluted seawater, ~1% with 20 times diluted seawater, and no recovery observed with 100 times diluted seawater. Therefore, the total incremental oil recovery, beyond conventional waterflooding, is 19.5% by stepwise salinity and ion content reduction of injected water. Therefore, the trend is very consistent with Example 1 and the incremental oil recovery is even higher in this case. Therefore, these results confirmed and validated that significant additional oil recovery beyond seawater flooding can be achieved by stepwise salinity and ionic content reduction of the injected seawater in carbonate rock reservoir.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

We claim:

1. A process for recovering hydrocarbons in carbonate reservoirs, the process comprising the steps of:
    (a) introducing a first water solution into the carbonate reservoir, wherein the first water solution has a first salt concentration;

(b) recovering an amount of hydrocarbon from the carbonate reservoir;
(c) introducing a second water solution into the carbonate reservoir, wherein the second water solution has a second salt concentration that is lower than the first salt concentration; and
(d) recovering a second amount of hydrocarbon from the carbonate reservoir,
wherein the first water solution comprises sulfate ions, calcium ions, and magnesium ions.

2. The process of claim 1, wherein the ratio of the second salt concentration to the first salt concentration is in a range from about 0.1 to 0.9.

3. The process of claim 1, wherein the ratio of the second salt concentration to the first salt concentration is in a range from about 0.5 to 0.75.

4. The process of claim 1, wherein the ratio of the second salt concentration to the first salt concentration is about 0.5.

5. The process of claim 1, wherein the first salt concentration is within a range of 35,000 to 70,000 ppm by weight.

6. The process of claim 1, wherein the second salt concentration is within a range of 3,500 to 60,000 ppm by weight.

7. The process of claim 1, wherein the second salt concentration is within a range of 17,500 to 52,500 ppm by weight.

8. The process of claim 1, wherein the second salt concentration is within a range of 17,500 to 35,000 ppm by weight.

9. The process of claim 1, wherein the temperature within the carbonate reservoir is between 70° C. and 100° C.

10. The process of claim 1 further comprising:
(a) introducing a third water solution into the carbonate reservoir, wherein the third water solution has a third salt concentration that is lower than the second salt concentration; and
(b) recovering a third amount of hydrocarbon from the carbonate reservoir.

11. The process of claim 10, wherein the ratio of the third salt concentration to the first salt concentration is in a range from about 0.05 to 0.1.

12. The process of claim 10, wherein the third salt concentration is within a range of 1,750 to 7,000 ppm by weight.

13. The process of claim 10, wherein the third salt concentration is within a range of 3,500 to 7,000 ppm by weight.

14. The process of claim 10, wherein the recovering step is continued until the second amount of hydrocarbon recovered provides at least a 9% improvement in incremental oil recovery.

15. The process of claim 1, wherein the carbonate reservoir is substantially free of clay.

16. The process of claim 1, wherein the carbonate reservoir has an absence of clay.

17. The process of claim 1, wherein the carbonate reservoir has an absence of sandstone rock.

18. The process of claim 1, wherein the temperature within the carbonate reservoir is above 70° C.

19. The process of claim 1, wherein the temperature within the carbonate reservoir is about 100° C.

20. A process for recovering hydrocarbons in carbonate reservoirs, the process comprising the steps of
(a) introducing a second water solution into a carbonate reservoir that has already been subjected to an enhanced oil recovery process that employed an initial salt water flooding, wherein the initial salt water flooding used a salt water solution having a first salt concentration, wherein the second water solution comprises a second salt concentration that is lower than the first salt concentration; and
(b) recovering a, second amount of hydrocarbon from the carbonate reservoir, wherein the second amount of hydrocarbon recovered provides at least a 7% incremental oil recovery,
wherein the second water solution has an ion composition, the ion composition comprising sulfate ions, calcium ions, and magnesium ions.

21. The process of claim 20, wherein the carbonate reservoir is substantially free of clay.

22. The process of claim 20, wherein the carbonate reservoir has an absence of clay.

23. The process of claim 20, wherein the carbonate reservoir has an absence of sandstone rock.

24. The process of claim 20, wherein the temperature within the carbonate reservoir is above 70° C.

\* \* \* \* \*